R. S. Torrey,
Drill Rod Grab.
N° 67,464. Patented Aug. 6, 1867.
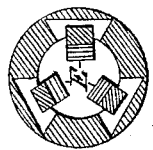
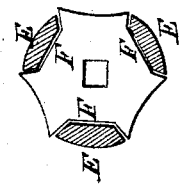
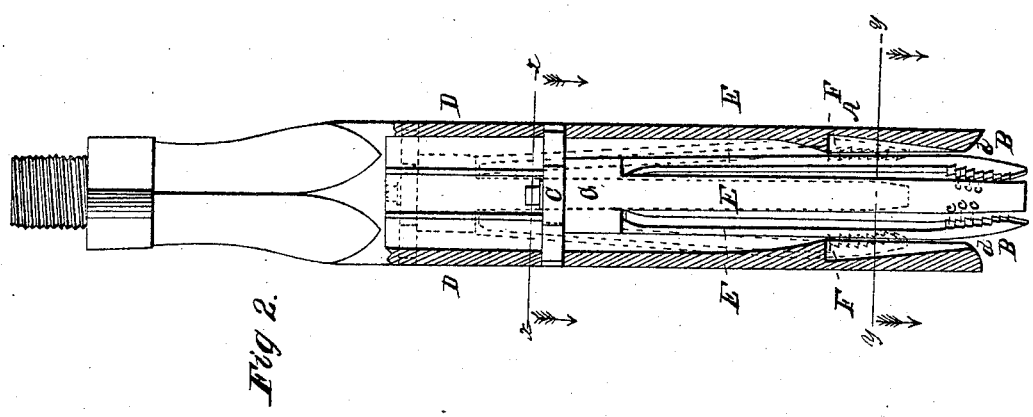
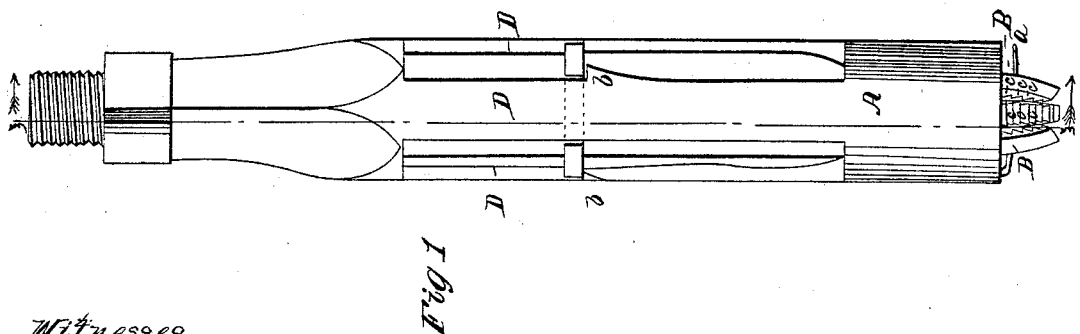
Witnesses.
Chas M Gay
O. S. Baker
Inventor.
R. S. Torrey. by
Brown & Beadle Atty's

United States Patent Office.

R. S. TORREY, OF BANGOR, MAINE.

Letters Patent No. 67,464, dated August 6, 1867.

---

IMPROVED TOOL-EXTRACTOR.

---

*The Schedule referred to in these Letters Patent and making part of the same.*

---

TO ALL WHOM IT MAY CONCERN:

Be it known that I, R. S. TORREY, of Bangor, Penobscot county, State of Maine, have invented a new and useful Improvement in Tool-Extractors for Oil Wells; and I do hereby declare the following description and accompanying drawings are sufficient to enable any person skilled in the art or science to which it most nearly appertains to make and use my said invention or improvements without further invention or experiment.

The nature of my invention and improvements consists in a novel arrangement of steel or iron mechanism, as hereafter fully described, for the purpose of withdrawing the lower parts of tools broken in the process of boring artesian wells.

A represents a hollow cylinder of an external diameter a quarter of an inch or thereabout less than that of the well, and of an internal diameter an inch less than the external, so that the thickness of the cylinder at the bottom is half an inch. Its lower edge is chamfered off, as shown at $d$, fig. 2, that it may the more easily put itself outside of the broken tool, in which operation it is assisted by the worm $a$, fig. 1. In its interior are cut three longitudinal grooves, shown at F, figs. 2 and 4, at equal distances apart, and of a depth varying from three-eighths of an inch at the top of the cylinder to nothing at the bottom, for a purpose hereinafter described. To the cylinder A are attached in any convenient manner arms D four feet long, more or less, the upper ends of which are welded together into a solid mass, as shown in figs. 1 and 2, out of which is cut a male screw, so that the instrument may be attached to the boring-rod in place of the drills when a boring-rod is used. B represents serrated jaws moving in the grooves F, which are rigidly connected by elastic bars E to the solid head G secured in the centre of the guide C, which plays up and down to any extent required between the projections $b$ on the arms D and the head of the tool.

The operation is as follows: The machine having been lowered into the well, (the jaws B having been previously put in the position shown in red lines, fig. 2, and kept expanded to their fullest extent by a piece of wood placed between them,) encounters the upper end of the broken tool, which enters within the cylinder A, knocks away the piece of wood which keeps the jaws B apart, and passes within them at the same time that they slide down in the grooves F as far as possible, being forced by the convergency of the grooves into close contact with the broken tool as they descend. The lifting machinery at the top of the well is then brought into play, and raises first that part of the apparatus rigidly connected with the boring-bar or drill-rope, while the jaws B are detained by the broken tool, into which the teeth $c$ are firmly forced by the pressure of the ridges at the bottom of the cylinder A lying between the lower ends of the grooves F and the upper edge of the chamfered portion $d$, until the guide C comes in contact with the projections $b$ on the arms D, when the jaws B, of course, are forced upward, bringing up with them the broken tool. The serrations $c$ are ratchet-teeth, as shown, for greater efficiency in an upward pull.

What I claim as new, and desire to secure by Letters Patent, is—

The worm $a$, in combination with the cylinder A and the sliding arrangement B E G, in the manner and for the purpose described.

R. S. TORREY.

Witnesses:
    THOS. D. MITCHELL,
    WM. MITCHELL.